United States Patent [19]
Genovese

[11] Patent Number: 5,508,513
[45] Date of Patent: Apr. 16, 1996

[54] FIBER OPTIC SCANNING BEAM DETECTOR

[75] Inventor: Frank C. Genovese, Fairport, N.Y.

[73] Assignee: Xerox Corporation, Stamford, Conn.

[21] Appl. No.: 352,947

[22] Filed: Dec. 9, 1994

[51] Int. Cl.$^6$ .............................. H01J 3/14; G02B 26/10
[52] U.S. Cl. ................... 250/227.26; 250/236; 358/484
[58] Field of Search .................. 250/227.26, 227.29, 250/227.31, 227.24, 227.11, 236, 235, 234, 216; 385/12, 38, 146; 356/731; 358/484, 483, 482, 901

[56] References Cited

U.S. PATENT DOCUMENTS

| | | | |
|---|---|---|---|
| 4,071,754 | 1/1978 | Roulund | 250/227 |
| 4,386,272 | 5/1983 | Check, Jr. et al. | 250/236 |
| 4,500,204 | 2/1985 | Ogura | 250/227.26 |
| 4,638,156 | 1/1987 | Horikawa et al. | 250/227.26 |
| 4,952,022 | 8/1990 | Genovese | 350/96.24 |
| 5,245,181 | 9/1993 | Cho | 250/236 |

Primary Examiner—Edward P. Westin
Assistant Examiner—John R. Lee

[57] ABSTRACT

A fiber optic system is used in a laser ROS scanning system to generate a start of scan signal. In one embodiment, a single optical fiber is positioned at the beginning of a scan line sweep. The fiber transmits a portion of a scan beam energy, directed non-axially into the fiber entrance to a photosensor. The photosensor generates an output response which is processed to initiate the SOS signal. The fiber entrance face is formed so that the beam, entering non-axially, is either reflected internally along the fiber axis or first refracted and then reflected along the fiber axis. Dual fiber embodiments are also presented which detect and transmit non-axially incident scanning beams.

7 Claims, 9 Drawing Sheets

FIBER OPTIC SCANNING BEAM DETECTOR

BACKGROUND AND MATERIAL DISCLOSURE STATEMENT

The invention broadly relates to a Raster Output Scanner (ROS) imaging system, and, more particularly, to a means and method for generating timing signals responsive to the detection of a scanning beam crossing a fiber optic detector.

In conventional ROS systems, an intensity modulated light beam generated by a gas or diode laser is repetitively scanned across the surface of a photosensitive image plane to form a latent image of a document or the like represented by input binary data. Each scan line comprises composite images of individual pixels representing on and off states of the laser. These pixels must be aligned from scan to scan in the vertical or fast-scan direction; failure to do so results in the phenomenon known as scan line "jitter". It is known in the prior art that photodetectors can be positioned in the scan path a predetermined distance upstream from the recording surface where their output is used to generate a Start Of Scan (SOS) signal controlling the timing of the laser modulation waveform. Exemplary of the known detectors is a slit detector design in which the amplitude of the photodiode output signal is compared with a predetermined fixed reference voltage. When the scanned laser beam passes over the photodetector surface, the amplitude of the output signal reaches this reference threshold and an SOS pulse is generated. Also known is the so-called split detector which utilizes two adjacent photodiodes in very close proximity in an electronic comparator configuration that compensates for variations in scanning beam power. In operation, the sweep of the beam over the first detector establishes a dynamic reference level for the second detector that is proportional to the intensity of the scanned light beam. With this arrangement, the comparator is triggered when the swept beam is positioned at the midpoint between the detectors and the light levels in both detectors match exactly. An example of a split detector is disclosed in U.S. Pat. No. 4,386,272.

For many high speed, high resolution Raster Output Scanner (ROS) systems, a solid state laser diode or a HeNe laser is the preferred device for generating the recording beams. As is well known, the power output of these lasers varies in amplitude over time. The conventional slit detector, when used with a laser scanning system, is subject to jitter because the output current of the photodetector responds proportionately, in amplitude, to the Gaussian shape of the scanned beam as it sweeps across the face of the detector. Outputs produced by beams of different power levels will, necessarily, reach the fixed reference level at different relative times, resulting in SOS outputs at different times relative to passage of the center of a scanned Gaussian beam. Since the synchronization of the electronic system that controls the timing of the information bit stream defining the laser modulation waveforms for each line is keyed to the SOS pulse, this differential triggering effects a net translation of the exposure pattern of each scan line in the fast scan direction. As a result, the alignment of picture elements in the exposure raster from line to line is inexact.

The split detector generates an SOS output when the Gaussian beam is centered between the two photodetector sites. Since the response depends only on the relative position of the beam and not on a specific amplitude level, the SOS output signal timing is independent of the beam power. In other words, the split detector generates an SOS signal which does not vary in time when the diode intensity changes. Both the slit detector and the split detector are typically configured in the same fashion; the photodetector elements and associated amplifiers and pulse shaping electronics are assembled in a remote housing which is positioned adjacent to the imaging surface in or very close to the focal plane path of the scanned beam. SOS pulses from the detector assembly are returned via coaxial cable or twisted pair to a central electronic network containing the image data, system timing, and laser modulation circuitry.

A third detection method is known in the art wherein the position of a scanning laser beam is sensed by placing an optical fiber or light pipe in the path of the scanning beam to transmit the incident light to the central electronics system. The conveyed light energy is incident on an indicia as, for example, disclosed in U.S. Pat. No. 4,071,754, or on a photodetector, located on a central circuit board of the electronics system. The detector converts the light energy into an electrical signal which is then processed to provide synchronization signals for the laser. Another application discloses a fiber optic detector which uses a single optical fiber positioned in the scan path at the beginning of a scan line sweep. The fiber transmits a portion of the scan beam flux to a photodetector located on a central electronics circuit board. The photodiode generates an output signal which drives one input of a high speed comparator. The second comparator input is fed an amplified and delayed analog of the photodetector output signal. The comparator senses the difference in the two voltage wave forms and generates an output transition at the precise time the two wave forms cross over or intersect. The comparator output transition is used to initiate the scanning system SOS signal of a gas or laser diode ROS. Fiber optic detectors have several advantages over the split and slit detectors; they are more compact, less expensive, provide superior noise immunity and have simple mechanical mounting. Lower cost is realized because separate scan detector circuit boards and housings are not needed and because the cable and connectors that provide power and signals to and from the remote scan detector board are unnecessary. Noise immunity is superior because the laser printer environment is electrically noisy (EMI, RFI) and the remote scan detector and its cables are difficult to shield from this noisy environment. The optical fiber simply acts as a light flux conduit through the noisy environment to the local electronics board where the light signal is converted to an electronic signal in a controlled environment (shielded) where signal traces are short and noise is easier to control. Further, the mechanical mounting of the remote detector system is often awkward because the scanner footprint is typically narrow near the ROS image plane and the space available for the scan detector electronics board is relatively cramped. The optical fiber is very small and so is easier to locate and mount.

Figure 1:
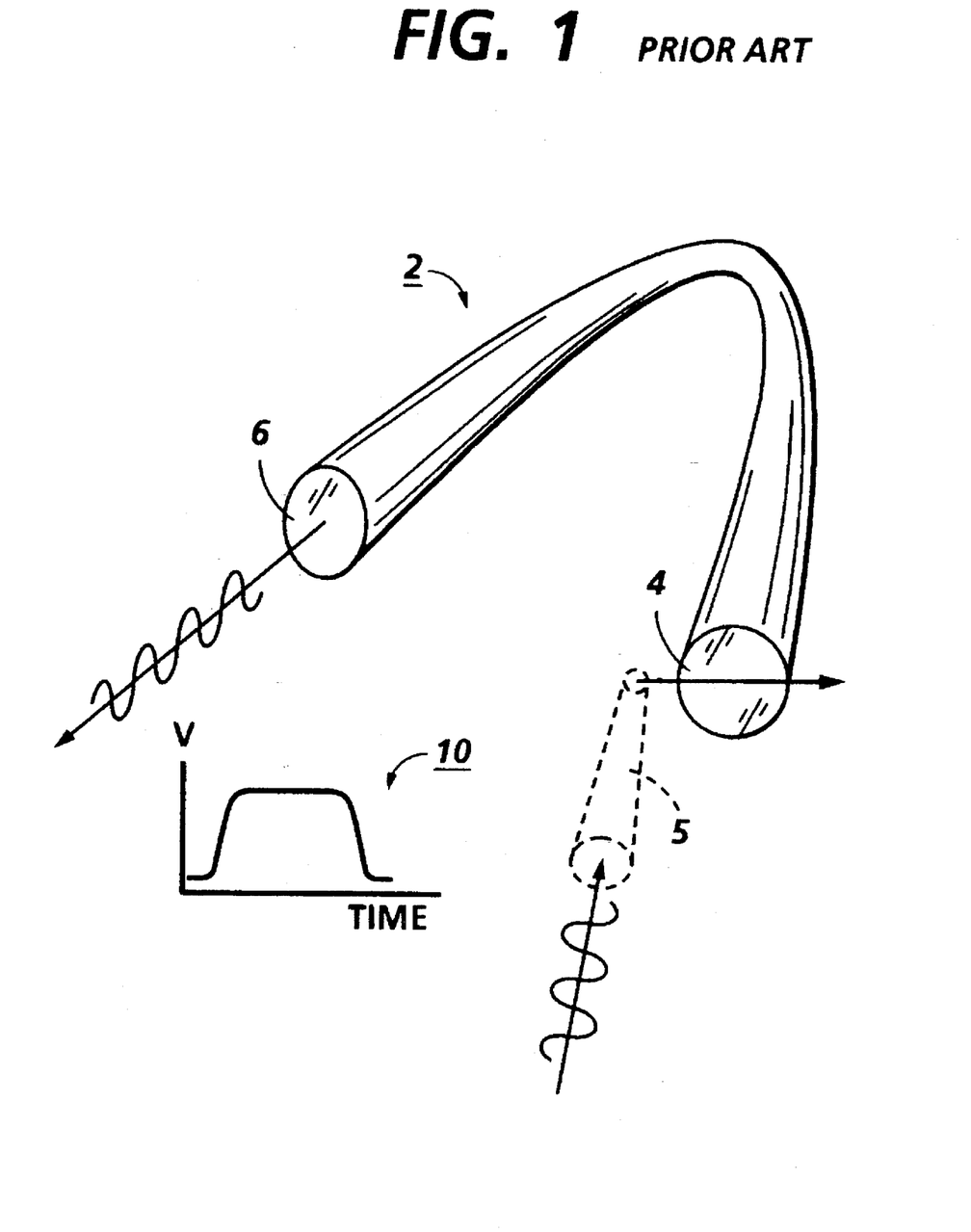
FIG. 1 shows a prior art single optical fiber detector with a axial light scan across the entrance end.

In the prior art fiber optic detection systems, the detected light, typically from a ROS scanning beam, is coupled axially into the input end of the fiber or a group of fibers. FIG. 1 shows a single large multimode optical fiber 2 with circular input and output end faces 4 and 6, respectively. A scanning beam 5 sweeps across the input end 4 and flux transmitted along the fiber axis is emitted at the output end 6. If a photosensor element is placed in close proximity to the light output end 6, flux from passage of the beam at the input end 4 will generate a photocurrent pulse waveform profile 10 representing the detected pulse. The transitions of this waveform may be too slow and the overall pulse length may be too long for the typical high speed circuitry used to generate the start of scan signals required for ROS images.

Figure 2:
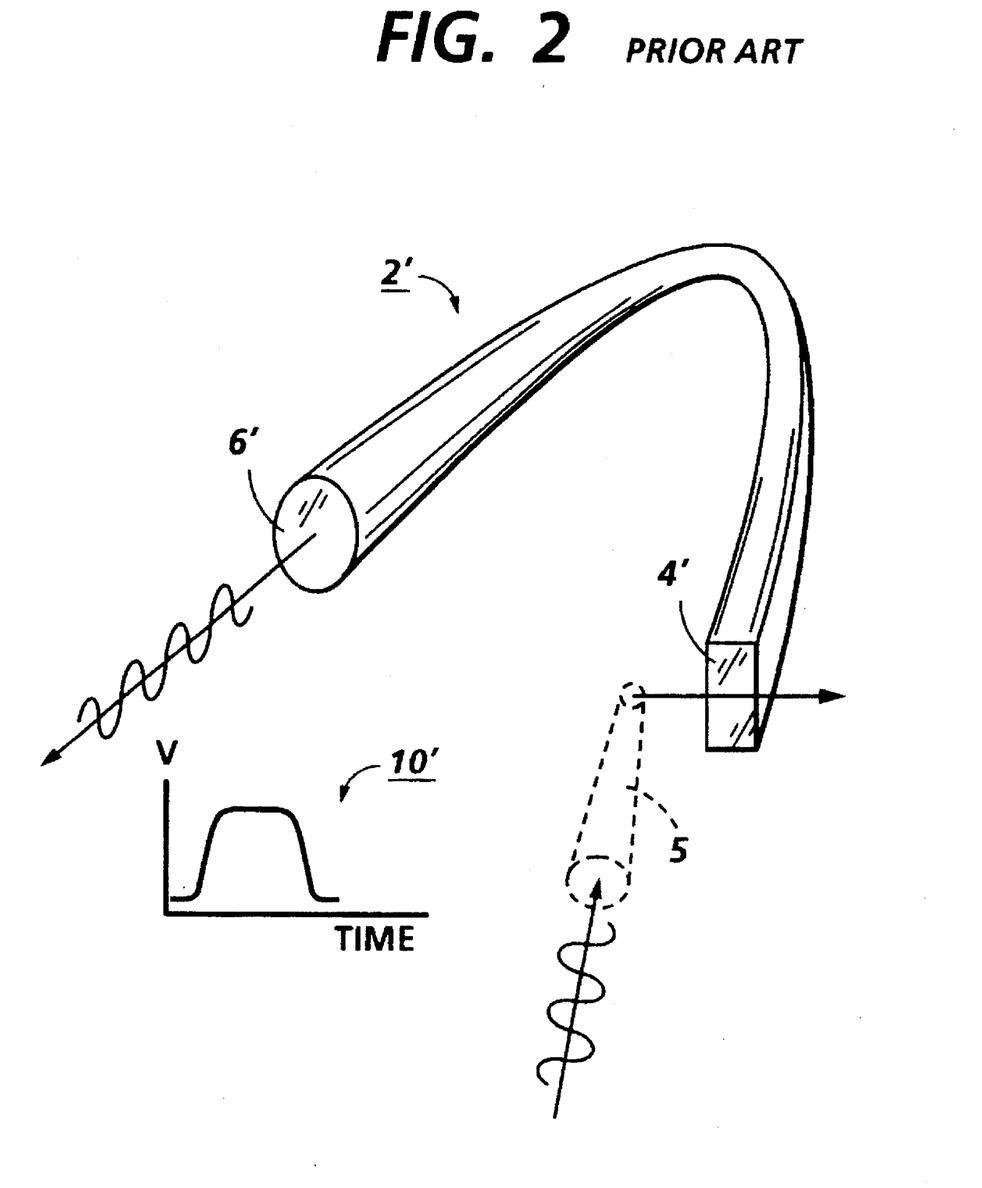
FIG. 2 shows the prior art single optical fiber detector of FIG. 1 modified by deforming the entrance end of the fiber.

FIG. 2 shows an optical fiber whose input end 4' has been changed to a rectangular configuration presenting a shorter face to the scanning beam. End 6' retains a circular configuration. End 4' can be deformed, for example, by the techniques disclosed in U.S. Pat. No. 4,952,022, whose contents are hereby incorporated by reference. Profile 10' is shown as relatively shorter than profile 10. End 4' can also be reshaped into a widened cross section so that subsequent alignment of the fiber end with respect to the scan path is less critical. These prior art configurations require that the input end of the fiber detector be oriented so that the scanning light beam flux enters the fiber axially, within a limiting cone angle determined by the numerical aperture (NA) of the fiber, in order to propagate, along the fiber length. It would be advantageous to remove this design constraint so that the fiber could assume other, non-axial, orientations relative to the scanning beam.

It is therefore an object of the invention to provide a fiber optic detection system wherein the detected light enters the fiber from a non-axial direction via an input face.

It is a further object to provide embodiments combining two or more optical fibers, each of the fibers receiving light non-axially.

These and other objects are realized by forming light admitting windows or facets in areas on or near the fiber entrance end using combinations of reflecting surfaces and the principle of total internal reflection to direct the light, once introduced non-axially into the fiber, axially down the fiber to a photosensor optically coupled to the exit end. In one embodiment, the fiber end is shaped so that light enters the fiber through a flattened window portion along the longitudinal surface. Once within the fiber, light flux strikes an angled end face and is reflected axially along the fiber length. In another embodiment, multiple fibers with their ends deformed into rectangles with an angled facet are stacked in an array, and a scanning beam is introduced into the fibers through windows formed along their edges.

More particularly, the invention relates to a fiber optic scanning beam detector comprising:

fiber optic means positioned in the path of a scanning beam of light to intercept said beam, said fiber optic means transmitting light energy from said intercepted beam onto a photosensor thereby causing said photosensor to generate an electrical signal corresponding to the intensity of said intercepted light energy, said fiber optic means comprising at least one optical fiber with at least a light entrance end and a light exit end with the entrance end modified so that the intercepted light enters the entrance end of the fiber in an non-axial direction.

DESCRIPTION OF THE INVENTION

Figure 3:
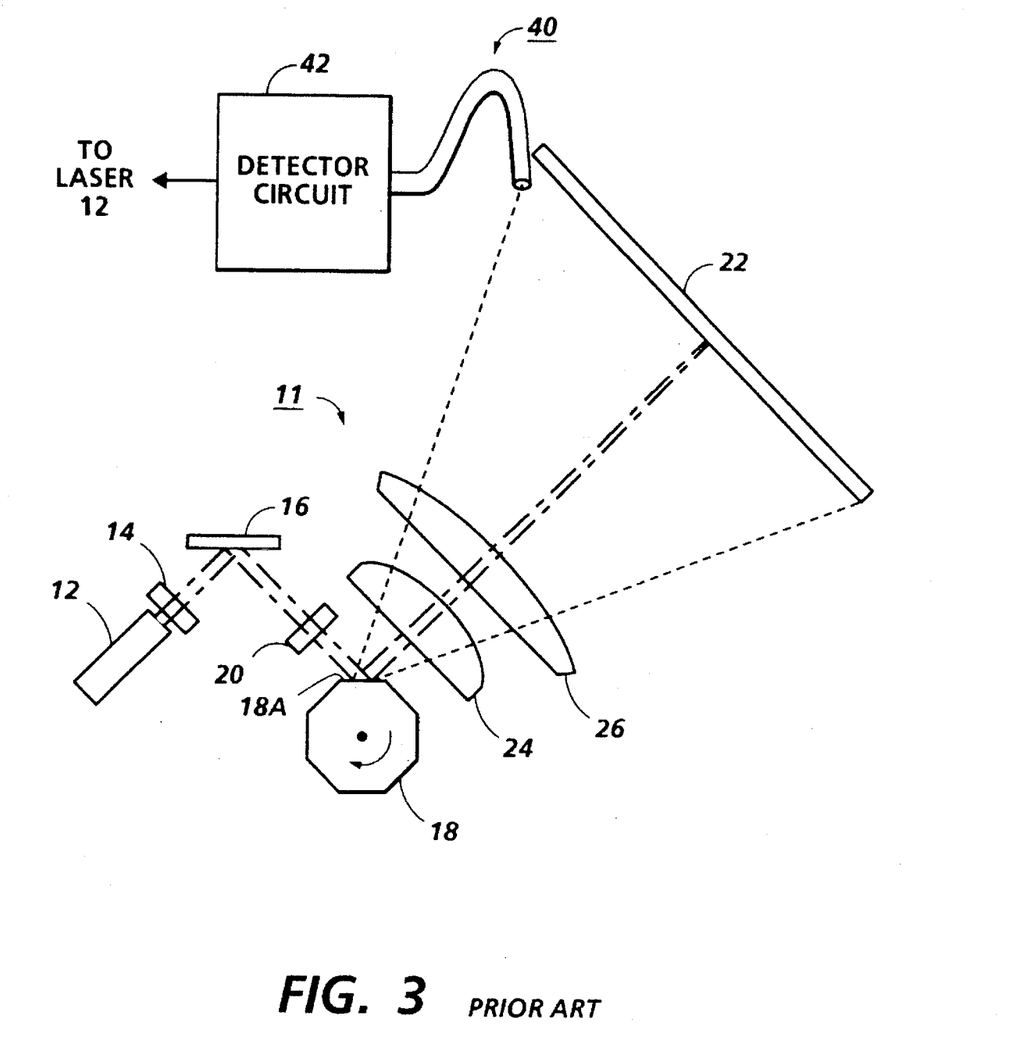
FIG. 3 is a top view in the tangential plane of a prior art ROS system using a single optical fiber to detect start of scan.

FIG. 3 is a top view of a prior art laser diode ROS scanner which utilizes a single optical fiber to detect axial crossing of a scanning beam and generate an SOS signal. Referring to FIG. 3, scanner 11 comprises a modulated diode laser 12 which receives binary input image data from a source (not shown) but conventional in the art; e.g. a RIS scanner or a computer. Optical element 14 provides conventional beam expansion and collimation of the modulated output of laser 12. The collimated output from element 14 is reflected by folding mirror 16 and is focused onto facets of rotating polygon 18, by a positive cylindrical lens 20 also used to optically correct for polygon-induced sagittal beam position error, (wobble error). The reflected rays from a facet, e.g. facet 18A of polygon 18 are focused in the fast scan direction (tangential plane) at image plane 22 by Fθ lens elements 24 and 26.

As the beam scans across image plane 22, light strikes single optical fiber detector 40 positioned at a SOS location. Incident light energy is transmitted through the fiber to a photosensor located in a detector circuit 42 containing circuitry which produces two separate electrical waveforms which are equivalent to two signals of the prior art split detector described in U.S. Pat. No. 4,386,272. The first signal is generated when the beam transmitted through the optical fiber is incident on the single site photosensor; the second signal is generated following a predetermined time delay.

Figure 4:
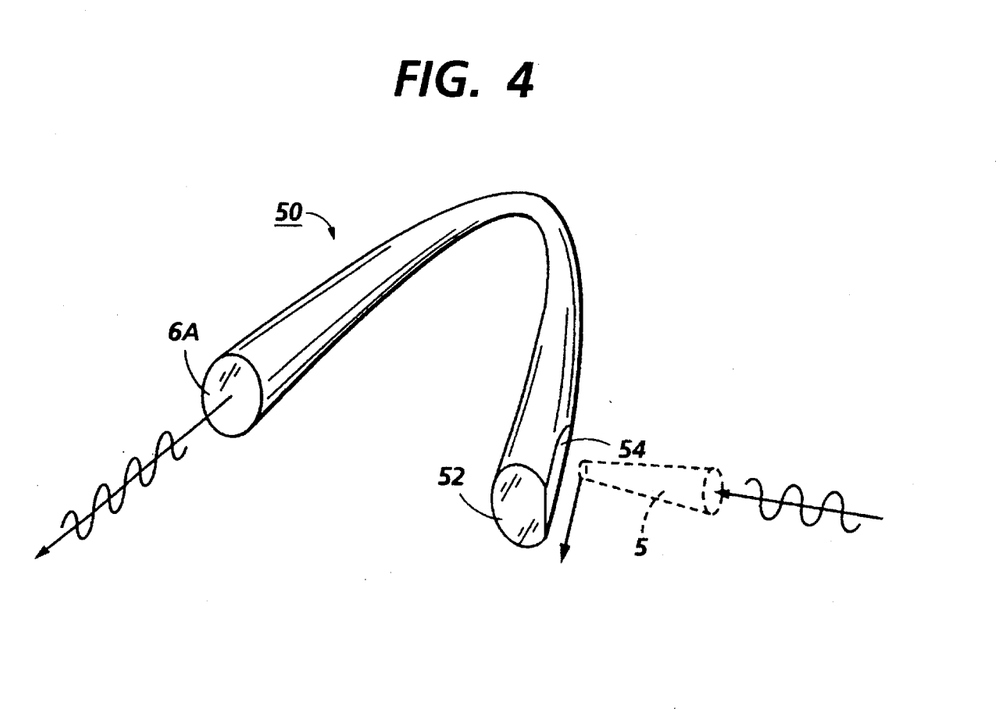
FIG. 4 shows a first embodiment of the invention wherein the entrance end of a single optical fiber is modified to enable a non-axial light scan across the entrance end.
Figure 4A:
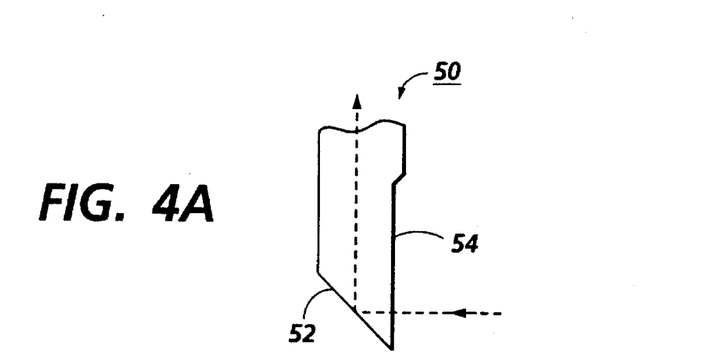
FIG. 4A shows the internal reflection path of the non-axial light scan.

It is understood that the ROS beam which scans across detector 40 is directed axially into the entrance end of fiber 40 as shown in FIG. 1. In a first embodiment of the invention, fiber 40 is modified and repositioned in the scan path as shown in FIGS. 4 and 4A. The modified fiber, identified as fiber 50, has an end facet 52 which is formed at a 45 degree angle. The side of fiber 50 proximate to end facet 52 has been flattened to form a recessed flat window 54. Thus the entrance end can be considered to consist of facet 52 and window 54. The fiber is positioned so that the ROS beam 5 scans across window 54 as indicated by the arrow in FIG. 4. Thus, light enters fiber 50 at window 54, and is internally reflected at the 45 degree facet 52 in the manner shown by the broken arrow in FIG. 4A. Once redirected along the fiber axis, the light flux signal propagates along the length of fiber 50 in the normal fashion by means of total internal reflection, exiting at end 6A. Those skilled in the art will understand that incorporation of the flat window 54 eliminates the angular spreading of the beam and skew rays caused by a highly cylindrical refracting surface in the beam path. Use of a flat window 54 in place of the curved fiber preserves the beam wavefront and minimizes light loss. The ROS beam is shown with a scanning path parallel to window 54 but could be in any direction across the window aperture; e.g., perpendicular to the scan path shown. This geometry is useful for avoiding large angle bends with small turning radii in the fiber.

Figures 5, 5A:
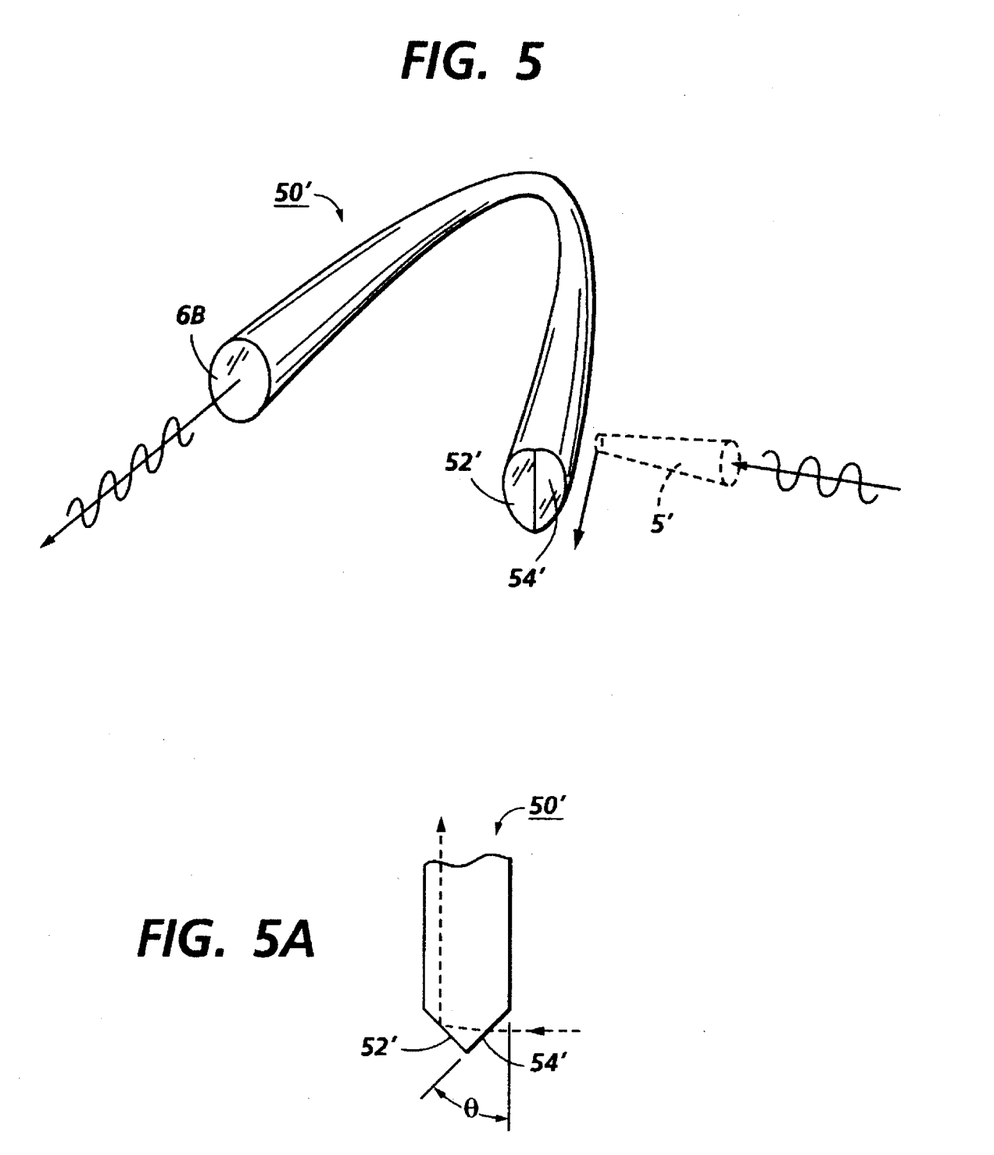
FIG. 5 is a second embodiment of a single fiber detector.
FIG. 5A shows the internal reflection path along the fiber of FIG. 5.

FIGS. 5, 5A show a second embodiment and a variation of FIG. 4, 4A where window 54' is oriented at an angle θ so that the incident beam path is refracted at window 54' and then is redirected axially along the fiber axis to exit end 6B by total internal reflection from facet 52'. For this embodiment, the fiber has a shorter active path in the direction shown by the arrow in FIG. 5. As shown in FIG. 5A, the design can be made symmetric so that it can be used to sense equally well from either side. To sense beams entering from either side at exactly 90 degrees (π/2), the facet angle θ must satisfy:

$$\mathrm{Sin}^{-1}(\mathrm{Sin}\theta/N)=3\theta-\pi/2$$

where N is the fiber index of refraction. For a fiber made of methyl methacrylate, N=1.486 at typical wavelengths of interest and the facet angle θ is 38.675 degrees.

Both FIGS. 4, 4A and 5, 5A are characterized by the scanning beam to be detected entering the fiber non-axially but, having entered the fiber, being transmitted axially along the fiber length.

Figure 6:
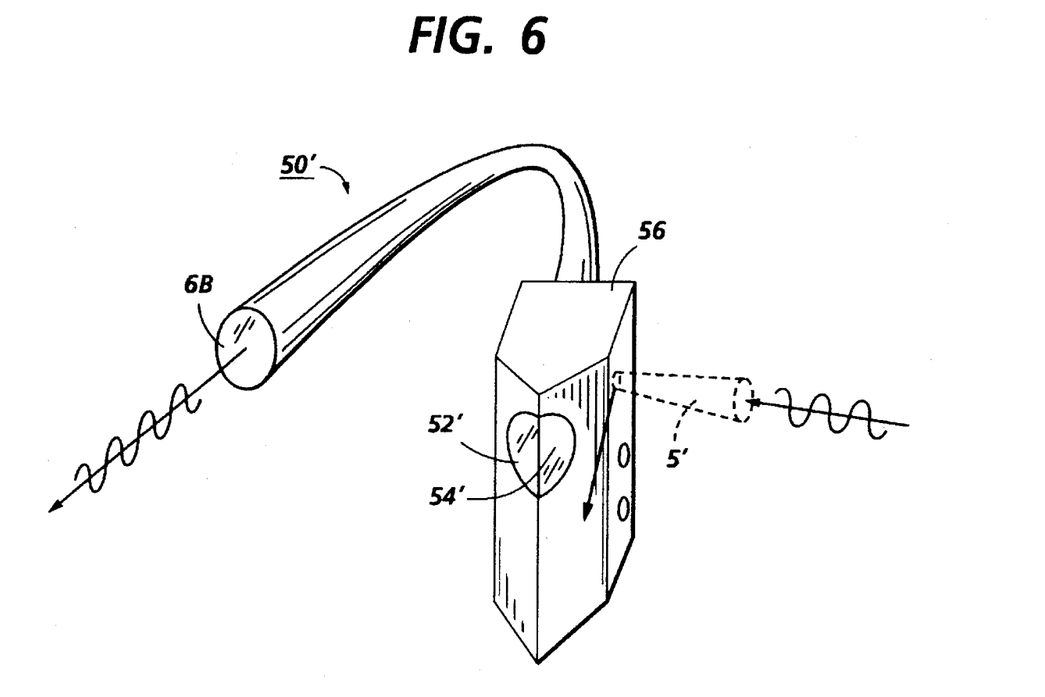
FIG. 6 is a mounting arrangement for the fiber detector of FIG. 4.

Referring now to FIG. 6, there is shown one method for facet alignment in which fiber 50' is shaped by being cut and polished after being potted in a mounting 56 designed to hold the fiber in alignment in the scanning beam path.

Figure 7:
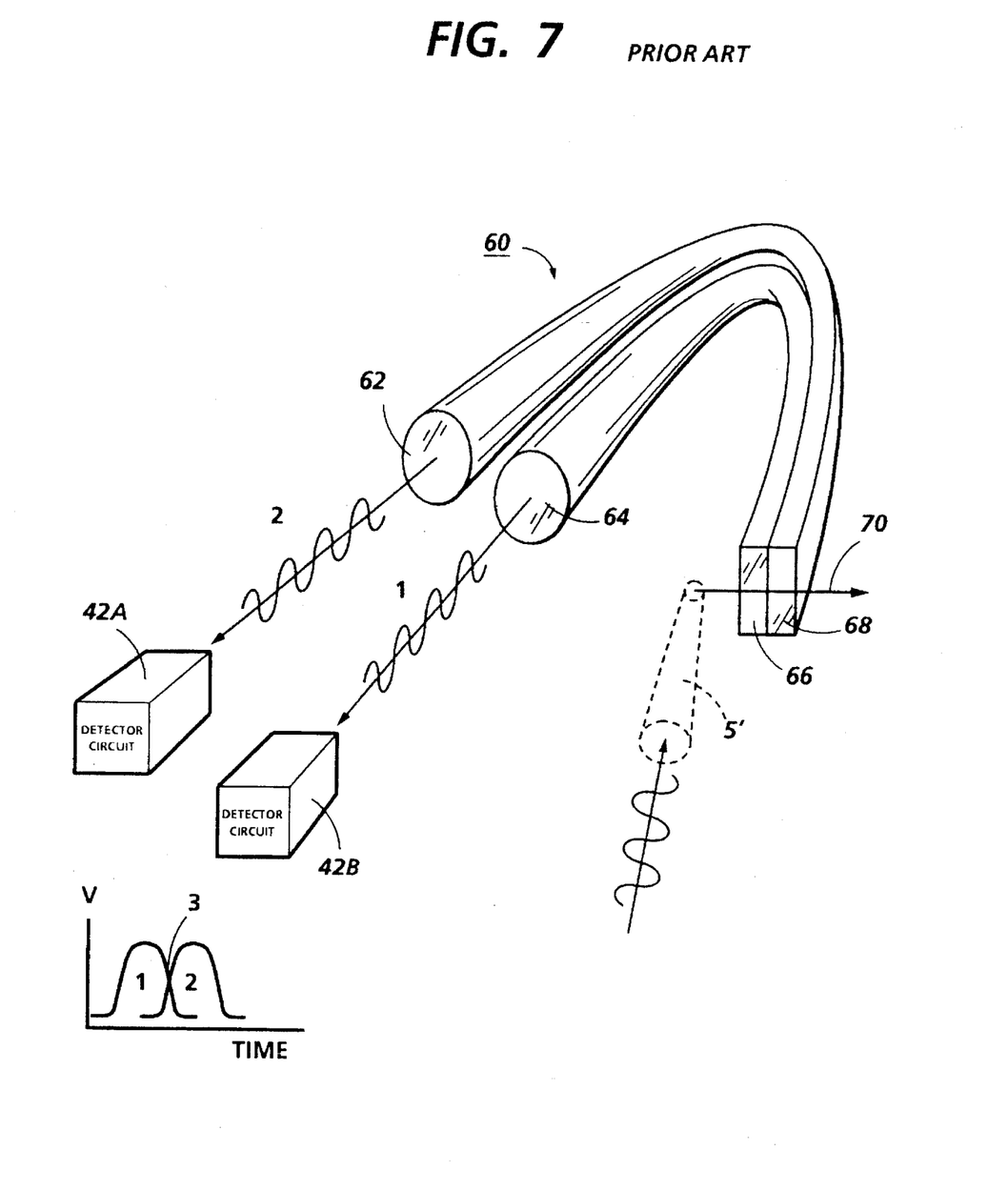
FIG. 7 is a prior art depiction of a dual fiber optical detector with an axial scan.
Figure 8:
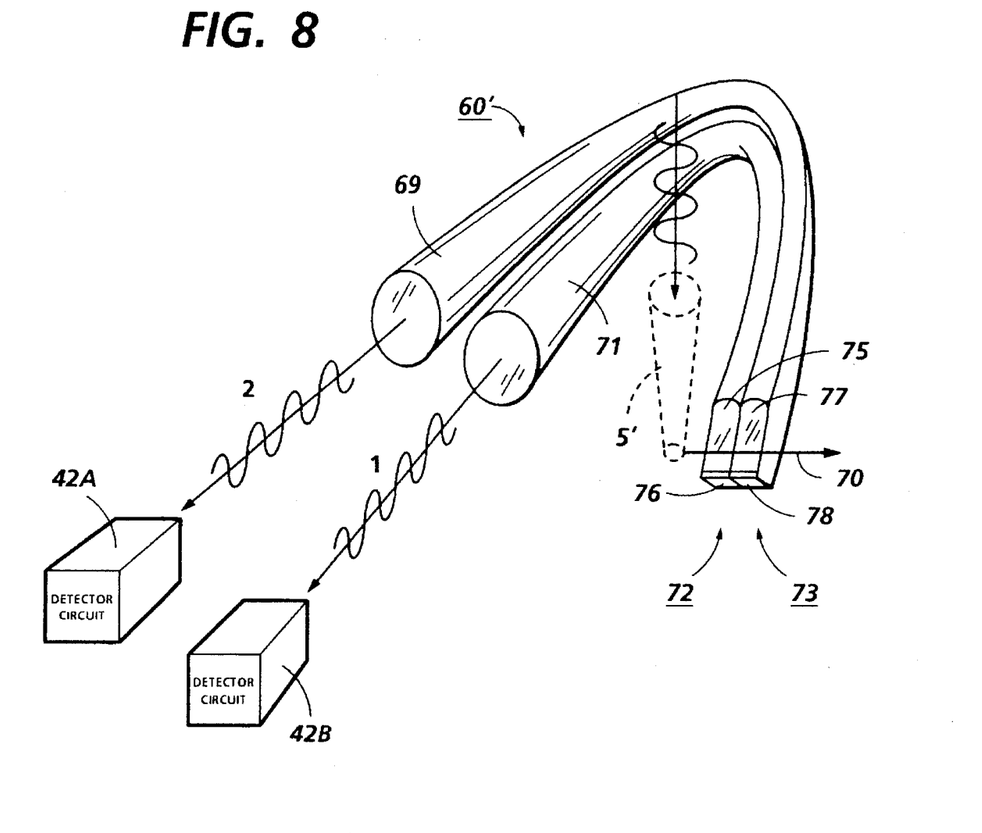
FIG. 8 is a first embodiment of a double fiber detector modified to enable non-axial light scan into each fiber.
Figure 8A:
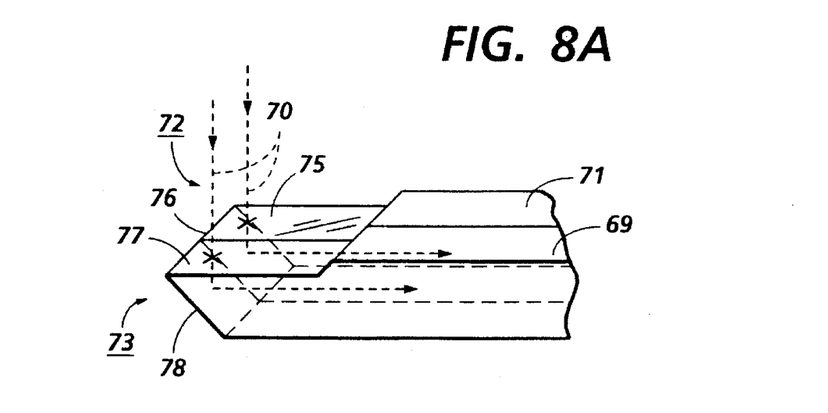
FIG. 8A shows the internal reflection path of the FIG. 8 dual fiber.

The previously described embodiments use a single fiber to collect light and require differential circuitry employing delays and other electronic techniques to generate the critically timed pulse required for a SOS signal. It is known in the prior art that two fibers can be used in a split detector system to generate crossing waveforms that define the SOS timing. FIG. 7 shows such a prior art detector 60 with fibers 62, 64 having rectangular entrance ends 68, 66, respectively. Light flux from a scanned beam following path 70 is directed axially into ends 68, 66. The output beams 1,2 are sensed by photodetector circuits 42B, 42A. The resulting waveforms 1 and 2 have a cross over point 3 which defines the SOS pulse initiating point. According to another aspect of the invention, this prior art dual fiber detector is modified so that the scan flux is incident non-axially along an edge. Referring to FIGS. 8, 8A, a modified dual fiber detector 60' includes fibers 69, 71, having light entrance ends 72, 73. Entrance end 72 includes a flattened entrance window 75 and an angled reflection surface 76. End face 73 has a flattened entrance window 77 and an angled reflection surface 78. The scan beam 5' enters through windows 75, 77, is reflected from surfaces 76, 78, respectively and directed axially along the length of fibers 69, 71. Outputs 1, 2 are optically coupled to separate photodetectors 42B, 42A.

Figure 9:
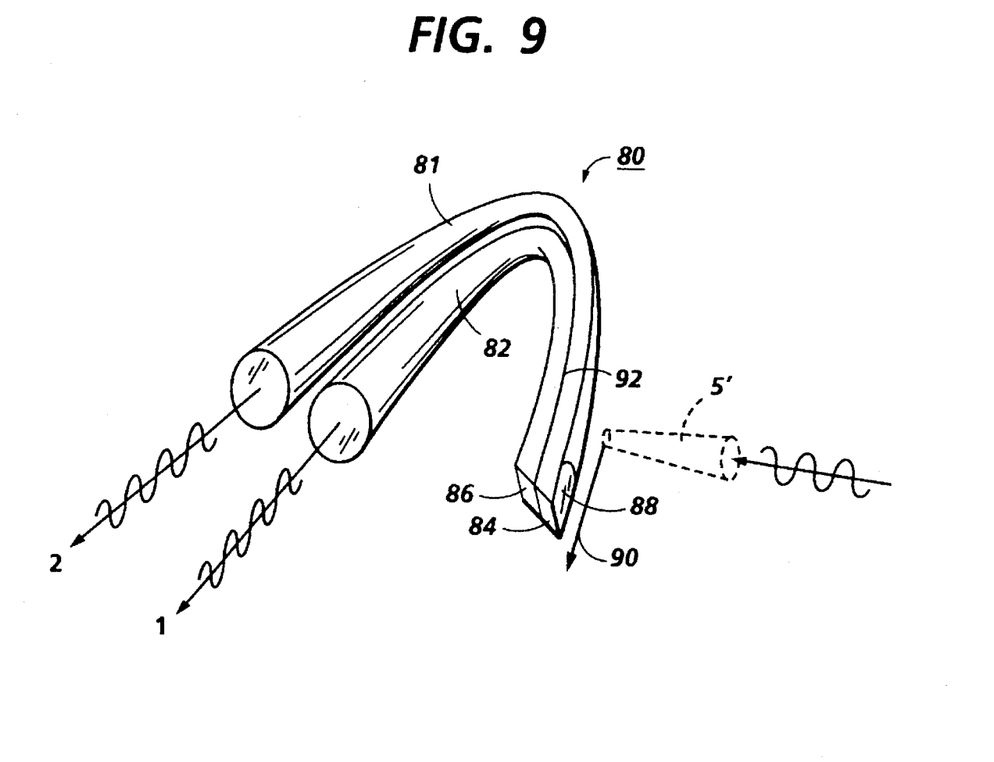
FIG. 9 is a second embodiment of a dual fiber optical detector.
Figure 9A:
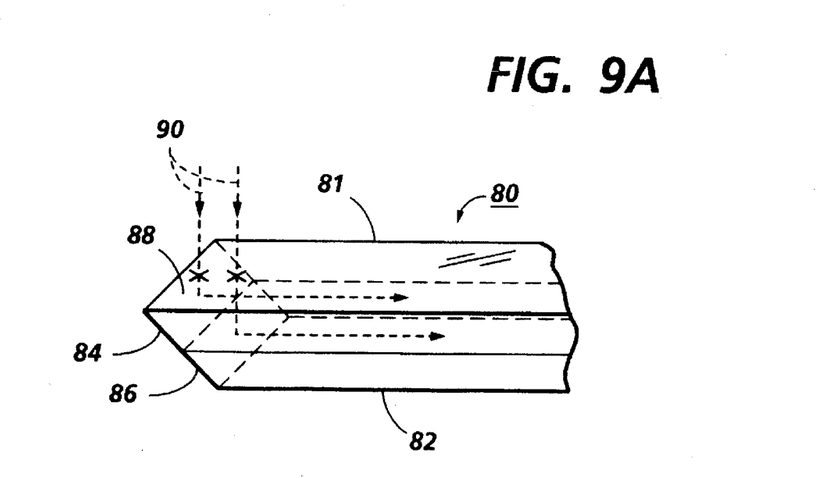
FIG. 9A shows the internal reflection path along the FIG. 9 dual fiber.

FIG. 9 is another dual fiber detector 80 in which the ends of fibers 81, 82 are shaped and illuminated from the side, similar to the single fiber embodiment of FIG. 4. Fibers 81, 82 have input ends 84, 86 angled as shown in FIGS. 9 and 9A. An entrance window 88 is formed at the end of fiber 81. A ROS beam 5' directed at window 88 and scanned along path 90 enters fiber 81 through window 88 and is reflected from angled facets 84, 86, being redirected axially along the length of the two fibers 81, 82. For this embodiment, fiber 82 is illuminated by flux that first passes completely through fiber 81. Cross talk is controlled by a thin low index cladding layer 92 between the two fibers.

The dual fibers can be mounted in a manner similar to the single beam arrangements shown in FIGS. 6, 6A.

While the embodiments disclosed herein are preferred, it will be appreciated from this teaching that various alternative, modifications, variations or improvements therein may be made by those skilled in the art, which are intended to be encompassed by the following claims:

What is claimed is:

1. A fiber optic scanning beam detector comprising:

fiber optic means intercepting a scanning light beam, said fiber optic means for transmitting light energy from said beam onto a photosensor thereby causing said photosensor to generate an electrical signal corresponding to the intensity of said beam, said fiber optic means comprising at least one optical fiber having a light entrance end an elongated body, and a light exit end, wherein the beam enters the light entrace end of the fiber in a non-axial direction, wherein the light entrance end comprises a facet orientated at an angle with respect to the elongated body, and wherein said light entrance end further comprises recessed flat window proximate said facet, said fiber optic means positioned such that the beam enters said flat window such that the beam is reflected from said facet and is redirected along the elongated body.

2. The detector of claim 1 wherein said flat window is oriented at an angle θ with respect to the facet and wherein said flat window is positioned so that the beam is refracted at the window and totally internally reflected along the elongated body.

3. A fiber optic scanning beam detector comprising:

fiber optic means intercepting a scanning light beam, said fiber optic means transmitting light energy from said beam onto a photosensor thereby causing said photosensor to generate an electrical signal corresponding to the intensity of said beam, said fiber optic means comprising at least two optical fibers each optical fiber having a light entrance end an elongated body, and a light exit end wherein the entrance end of each optical fiber has a flat entrance window and a reflection surface at an angle with respect to the elongated body, said fiber optic means being positioned such that the beam enters the flat window of each of said two optical fibers and is reflected from said reflection surfaces and is directed axially along the elongated body of said two optical fibers.

4. A fiber optic scanning beam detector comprising:

a scanning beam of light;

a fiber optic element having a first fiber with an entrance end comprised of a first surface and a second surface, said first fiber further comprising an elongated body which terminates in a light exit end, said fiber optic element positioned such that said first surface intercepts said scanning beam such that said intercepted scanning beam passes through said first surface, and such that said second surface reflects said scanning beam such that the scanning beam exits said light exit end; and a photosensor for receiving said scanning beam which exits said light exit end, said photosensor for generating an electrical signal that corresponds to the intensity of said scanning beam.

5. The detector of claim 4 wherein said second surface is oriented at an angle θ with respect to the first surface so that said scanning beam is first refracted at the first surface and totally internally reflected by the second surface along the elongated body.

6. The detector of claim 4, wherein said fiber optic element further comprises a second fiber having an entrance end comprised of a third surface and a fourth surfaces said second fiber further comprised of an elongated body which terminates in a light exit end, said fiber optic element positioned such that said third surface intercepts said scanning beam, such that said scanning beam passes said third surface and such that said fourth surface reflects said scanning beam such that the scanning beam exits said light exit end of said fiber and is received by said photosensor.

7. The detector of claim 6, wherein said third surface forms, an angle $\theta$ with said fourth surface such that said scanning beam is first refracted at the third surface and totally internally reflected by the fourth surface.

* * * * *